(12) United States Patent
von Flotow et al.

(10) Patent No.: US 7,876,359 B2
(45) Date of Patent: Jan. 25, 2011

(54) COOPERATIVE NESTING OF MECHANICAL AND ELECTRONIC STABILIZATION FOR AN AIRBORNE CAMERA SYSTEM

(75) Inventors: Andreas H. von Flotow, Hood River, OR (US); Mathieu Mercadal, Hood River, OR (US); Brian T. McGeer, Underwood, WA (US)

(73) Assignee: Insitu, Inc., Bingen, WA (US)

( * ) Notice: Subject to any disclaimer, the term of this patent is extended or adjusted under 35 U.S.C. 154(b) by 2061 days.

(21) Appl. No.: 10/726,334

(22) Filed: Dec. 1, 2003

(65) Prior Publication Data

US 2004/0183917 A1 Sep. 23, 2004

Related U.S. Application Data

(60) Provisional application No. 60/440,976, filed on Jan. 17, 2003, provisional application No. 60/440,983, filed on Jan. 17, 2003, provisional application No. 60/440,977, filed on Jan. 17, 2003.

(51) Int. Cl.
 *H04N 5/228* (2006.01)
 *H04N 7/00* (2006.01)
 *H04N 5/225* (2006.01)

(52) U.S. Cl. ............ 348/208.14; 348/113; 348/207.99
(58) Field of Classification Search .................. None
 See application file for complete search history.

(56) References Cited

U.S. PATENT DOCUMENTS

| | | | |
|---|---|---|---|
| 3,464,115 A | 9/1969 | Kissell | |
| 3,638,502 A | 2/1972 | Leavitt et al. | |
| 4,643,539 A | 2/1987 | Brignall | |
| 4,989,466 A | 2/1991 | Goodman | |
| 5,116,118 A | 5/1992 | Jones | |
| 5,184,521 A | 2/1993 | Tyler | |
| 5,259,037 A * | 11/1993 | Plunk | 382/154 |
| 5,347,910 A | 9/1994 | Avila et al. | |
| 5,629,988 A | 5/1997 | Burt et al. | |

(Continued)

FOREIGN PATENT DOCUMENTS

EP 0667708 A1 8/1995

(Continued)

OTHER PUBLICATIONS

Wu,Y.A. "EO Target Geolocation Determination," Proceedings of the 34th Conference on Decision & Control, New Orleans, LA, Dec. 1995, pp. 2766-2771, 7/95 IEEE.*

(Continued)

*Primary Examiner*—Thai Tran
*Assistant Examiner*—Heather R Jones
(74) *Attorney, Agent, or Firm*—Perkins Coie LLP

(57) ABSTRACT

A method and system for stabilizing images being taken by a video camera using electromechanical stabilization. The stabilization system performs inter-frame stabilization based on the velocity of a vehicle on which the video camera is mounted and the pan rate of a line-of-sight controller of the video camera. The inter-frame stabilization is performed by a software component by moving a display area (or viewport) within a larger image area. The stabilization system converts an inter-frame stabilization adjustment into a pan rate adjustment so that the line-of-sight controller will keep the desired object within the image area of the camera.

26 Claims, 12 Drawing Sheets

U.S. PATENT DOCUMENTS

| | | | |
|---|---|---|---|
| 5,687,249 | A | 11/1997 | Kato et al. |
| 5,897,223 | A | 4/1999 | Tritchew |
| 5,967,458 | A | 10/1999 | Williams et al. |
| 6,072,571 | A | 6/2000 | Houlberg |
| 6,100,925 | A | 8/2000 | Rosser et al. |
| 6,292,215 | B1* | 9/2001 | Vincent ............ 348/169 |
| 6,323,898 | B1 | 11/2001 | Koyanagi et al. |
| 6,377,906 | B1 | 4/2002 | Rowe |
| 6,672,535 | B2* | 1/2004 | Brunner et al. ............ 244/3.16 |
| 6,798,984 | B2 | 9/2004 | Antikidis |
| 6,995,788 | B2 | 2/2006 | James |
| 7,133,067 | B1* | 11/2006 | Claus et al. ............ 348/208.3 |
| 7,474,335 | B2* | 1/2009 | Basson et al. ............ 348/208.99 |
| 2002/0130953 | A1* | 9/2002 | Riconda et al. ............ 348/115 |

FOREIGN PATENT DOCUMENTS

| | | |
|---|---|---|
| EP | 0917103 A2 | 5/1999 |
| GB | 1116801 | 6/1968 |
| WO | WO-0195614 | 12/2001 |
| WO | WO-0237825 A2 | 5/2002 |

OTHER PUBLICATIONS

Wu, Y.A. "EO Target Geolocation Determination," Proceedings of the 34th Conference on Decision & Control, New Orleans, LA, Dec. 1995, pp. 2766-2771, 7/95 IEEE.

International Search Report and Written Opinion, International Application No. PCT/US04/01053, Applicant: Andreas H. Von Flotow, mailed Jul. 22, 2008, 9 pages.

U.S. Appl. No. 10/742,578, filed Sep. 9, 2004, Mathieu Mercadal.

U.S. Appl. No. 10/726,334, filed Sep. 23, 2004, Andreas H. von Flotow.

U.S. Appl. No. 10/758,684, filed Oct. 21, 2004, Andreas H. von Flotow.

Hansen et al., "Real-Time Scene Stabilization and Mosaic Constructions," Workshop on Applications of Computer Vision, Dec. 31, 1994, 9 pages.

Supplementary European Search Report, European Application No. 04702245.4, Applicant: The Insitu Group, mailed May 17, 2010, 4 pages.

* cited by examiner

COOPERATIVE NESTING OF MECHANICAL AND ELECTRONIC STABILIZATION FOR AN AIRBORNE CAMERA SYSTEM

CROSS-REFERENCE TO RELATED APPLICATIONS

This application claims the benefits of the following provisional applications:

| Provisional App. No. | Filing Date | Title |
| --- | --- | --- |
| 60/440,976 | Jan. 17, 2003 | Cooperative Nesting of Mechanical and Electric Stabilization for an Airborne Camera |
| 60/440,983 | Jan. 17, 2003 | Compensation for Overflight Velocity When Stabilizing an Airborne Camera |
| 60/440,977 | Jan. 17, 2003 | Method and Apparatus for Stabilizing Payloads Including Airborne Cameras | which are hereby incorporated by reference.

TECHNICAL FIELD

The described technology stabilizes an image stream created by an airborne video camera.

BACKGROUND

If not stabilized, the image streams created by airborne video cameras can be practically unusable for human observation because frame-to-frame image jitter is excessive. This image jitter typically is caused by small, fast pointing errors superposed upon larger-amplitude, slower pointing errors.

It is possible to reduce this image jitter to acceptable levels with refined mechanical stabilization techniques, stabilizing the line of sight of the image so that image jitter amplitude is less than an acceptable limit. Such an approach can deliver high-quality image streams from all types of cameras (video or film) but leads to large, heavy mechanical systems for support of the airborne camera. Such systems are the subject of U.S. Pat. Nos. 5,897,223; 3,638,502; 4,989,466; 4,643,539; and 5,184,521. An approach relying purely upon mechanical stabilization leads to heavy and complex mechanical systems.

Usually, multiple nested mechanical stages of stabilization are required, with each stage reducing the image jitter further, purely by reduction in jitter of the line of sight.

It would be desirable to have a technique to reduce jitter and avoid the need to have such large, heavy, and expensive mechanical systems.

DETAILED DESCRIPTION

Figure 1:
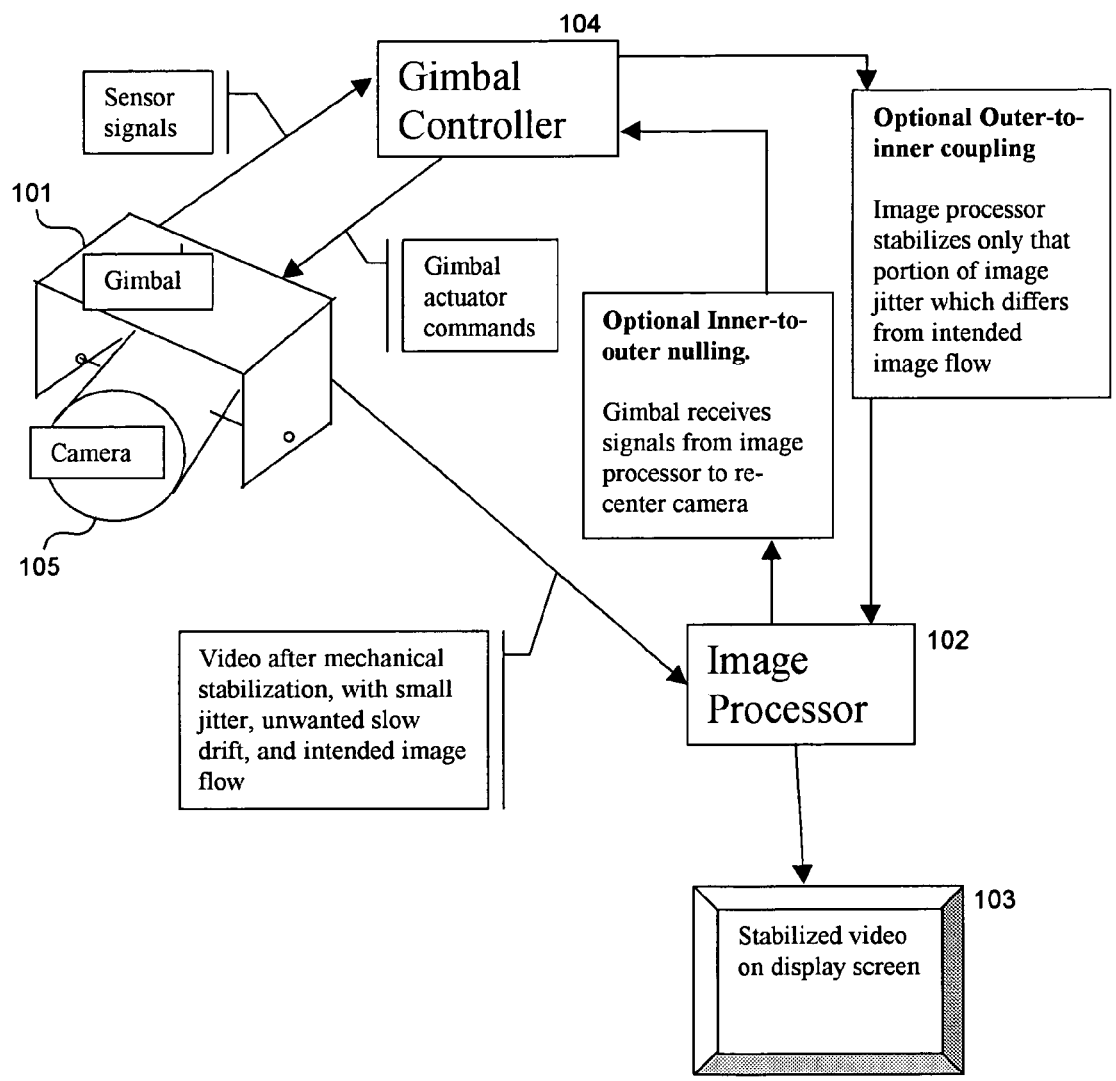
FIG. 1 is a block diagram that illustrates the bases of the stabilization system in one embodiment.

A method and system for stabilizing images being taken by a video camera using electromechanical stabilization is provided. In one embodiment, the stabilization system performs inter-frame stabilization based on the velocity of a vehicle on which the video camera is mounted and the pan rate of a line-of-sight controller of the video camera. The inter-frame stabilization is performed by a software component by moving a display area (or viewport) within a larger image area. The inter-frame stabilization removes small-amplitude jitter while accounting for vehicle velocity and orientation, pan rate and orientation of the line-of-sight controller, distance to an object within the image, and field of view of the camera. The stabilization system converts an inter-frame stabilization adjustment into a pan rate adjustment so the line-of-sight controller will keep the desired object within the image area of the camera. In this way, the stabilization system uses an electronic stabilization to remove small-amplitude jitters and feeds those adjustments to a mechanical stabilization to account for large-amplitude jitter.

In one embodiment, the stabilization system comprises a video camera controlled by a gimbal-based, line-of-sight controller that is mounted on an aircraft. While the aircraft is flying, the video camera feeds images to the software component that provides the inter-frame stabilization based on the scan and tilt rate (i.e., pan rate) of the line-of-sight controller. The software component removes small-amplitude jitter while factoring in the scan and tilt rate of the line-of-sight controller. The software component receives images from the camera that are larger than the display area. The software component moves the display area around within the larger image to remove the small-amplitude jitter. The software component then calculates a scan and tilt rate adjustment for the line-of-sight controller. The software component then provides the adjustment to the line-of-site controller so it can keep the video camera at the desired line of sight.

The stabilization system nests mechanical stabilization and electronic stabilization loops to exploit modern capabilities in electronics and image processing. Because not all of the stabilization is achieved mechanically, a simpler, cheaper, smaller, lighter, and lower-power mechanical gimbal system may be used.

The stabilization system uses an electronic image stabilization to augment mechanical line-of-sight stabilization to achieve full frame-to-frame stabilization of the image flow. The mechanical system is used for the large-amplitude, slow line-of-sight corrections required, while electronic stabilization is used for the small-amplitude, faster corrections not handled by the mechanical system. These stabilization loops are nested to take advantage of the characteristics of both types of stabilization. The stabilization system can implement various levels of interaction between these stabilization methods.

Inner-to-Outer Nulling

The fastest, smallest-amplitude stabilization is implemented electronically by "sliding" successive frames in the image stream on the display screen or on the focal plane array within the camera. This type of stabilization accounts for small amplitudes, typically a small fraction of the frame. The stabilization system provides the image correction implemented by this electronic stabilization to the mechanical pointing system (i.e., the line-of-sight controller) so that the mechanical pointing system can implement movements to cause the long-term average electronic image correction to tend toward zero. If such corrections are not implemented by the mechanical pointing system, then the displayed image might slowly drift and exceed the limits of practical correction of the electronic stabilization.

Outer-to-Inner Coupling

A user may want the image to "flow" across the screen, as for example, when the camera is panned while images are being gathered. An electronic stabilization system may misinterpret such image flow as unwanted jitter and will attempt to correct for it. Such misinterpretation would lead to momentarily stabilized images with sudden "steps" required when the electronic correction reaches its practical limit. The stabilization system can prevent such sudden steps if provided with image flow from the command system of the mechanical pointing system. Thus, the stabilization system can be used to enable smooth electronic image stabilization, even when the camera is being panned across a scene and the image flows across the display screen.

FIG. 1 is a block diagram that illustrates the bases of the stabilization system in one embodiment. Large-amplitude stabilization of camera line of sight is implemented with a motor-driven gimbal system 101 for controlling a camera 105. Small-amplitude stabilization of inter-frame motion is accomplished by electronic stabilization techniques implemented via an image processor 102. These electronic techniques shift the displayed image on a display screen 103 electronically by an adjustment and feed the adjustment to a gimbal controller 104. The image processor 102 may include a central processing unit, memory, input devices (e.g., keyboard and pointing devices), output devices (e.g., display devices), and storage devices (e.g., disk drives). The memory and storage devices are computer-readable media that may contain instructions that implement the electronic stabilization of the video stream provided by the camera 105. In addition, data structures and message structures (e.g., gimbal controller command and gimbal scan and tilt rate) may be stored or transmitted via a data transmission medium, such as a signal on a communications link.

Figure 2:
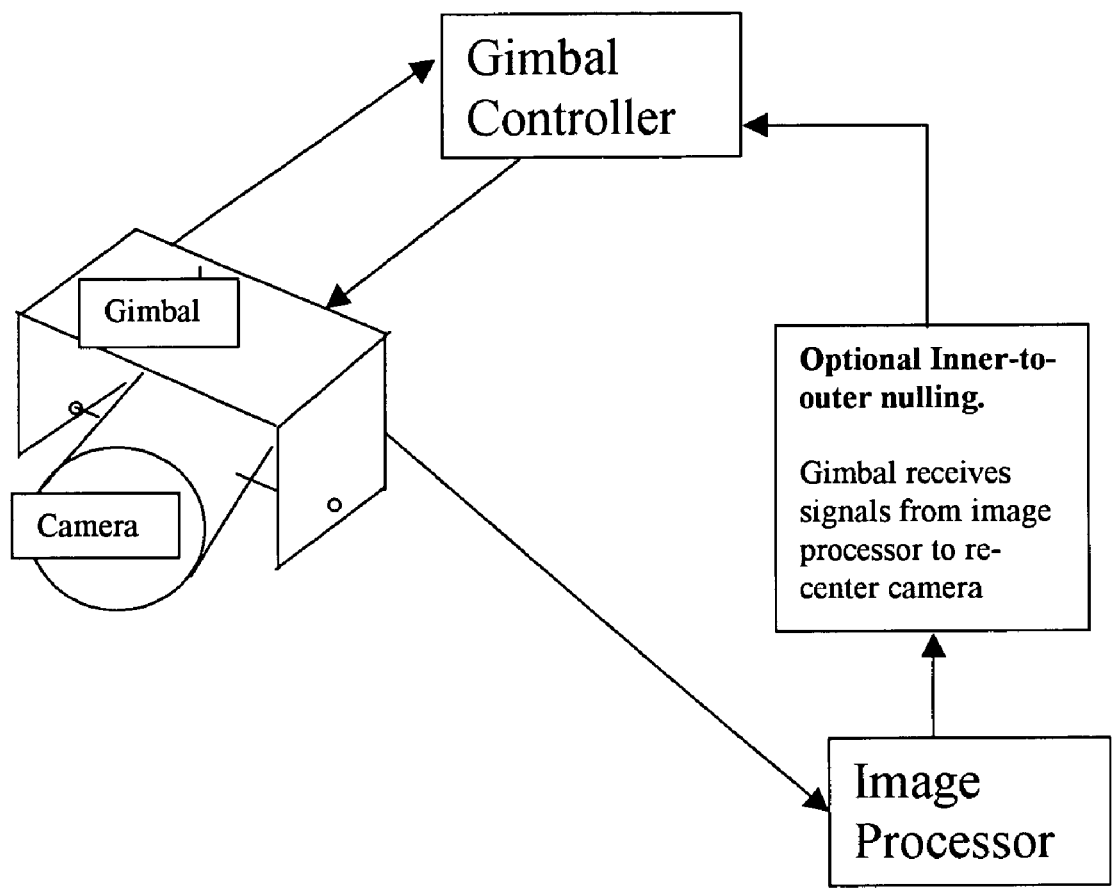
FIG. 2 is a block diagram that illustrates nesting of the two types of image stabilization in one embodiment.

FIG. 2 is a block diagram that illustrates the adjustment of the pan rate of the camera based on the inter-frame adjustment in one embodiment. The adjustment to the mechanical pointing system reduces any accumulating electronic image re-registration by mechanically re-pointing the camera. This allows the stabilization system to stabilize the image stream with a minimal loss of image size.

Figure 3:
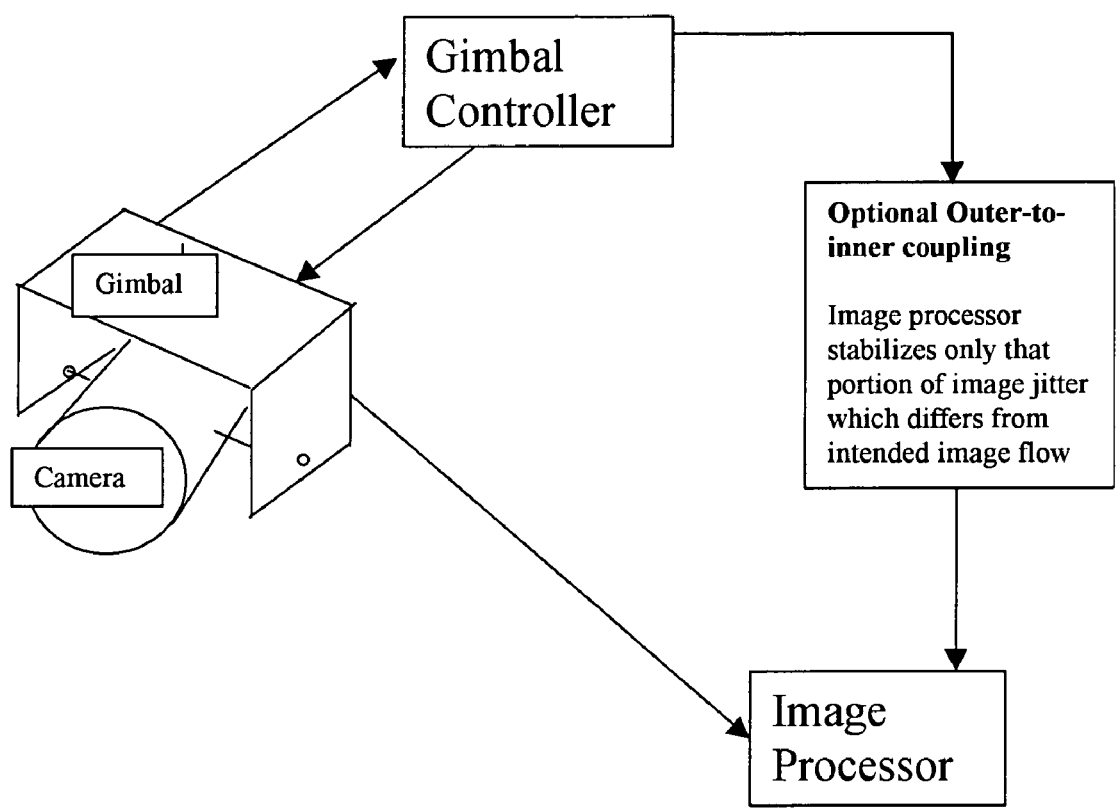
FIG. 3 is a block diagram that illustrates a coupling from the camera pointing system to the stabilization system in one embodiment.

FIG. 3 is a block diagram that illustrates the adjustment of the inter-frame stabilization based on the pan rate of the camera in one embodiment. This adjustment enables the stabilization system to stabilize successive images not simply in the display frame but rather to stabilize only unwanted motion between successive images. Thus, when the camera line of sight is intentionally panning the scene, the desired image flow is not suppressed by the stabilization system. Rather, the stabilization system suppresses only deviations from this desired image flow.

Figure 4A:
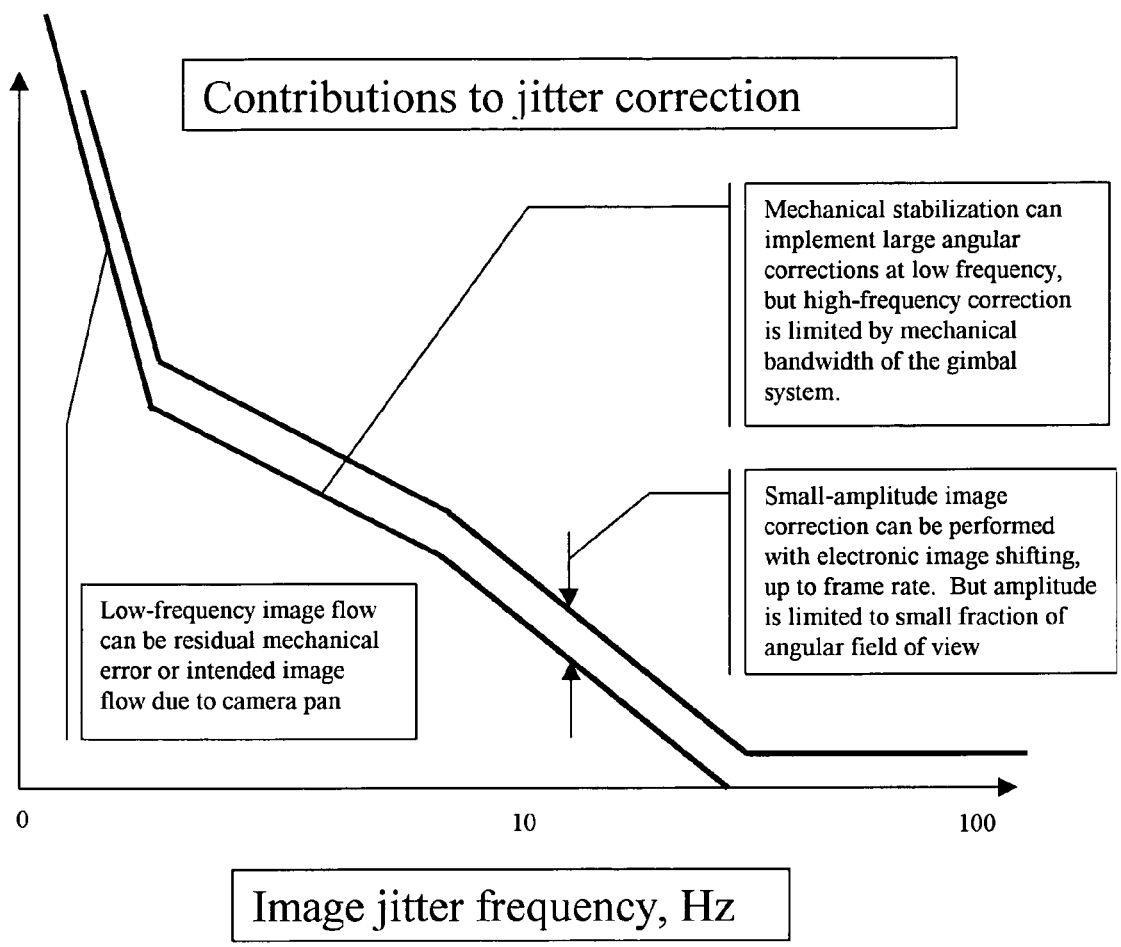
FIG. 4A is a graph that illustrates a typical error budget for the cooperative efforts of the various levels of image stabilization employed by the stabilization system in one embodiment.

FIG. 4A is a graph that illustrates a typical error budget for the cooperative efforts of the various levels of image stabilization employed by the stabilization system in one embodiment. Low-speed, large-amplitude stabilization is implemented by the mechanical gimbal system, while high-speed, small-amplitude stabilization is implemented by the electronic stabilization system.

Figure 4B:
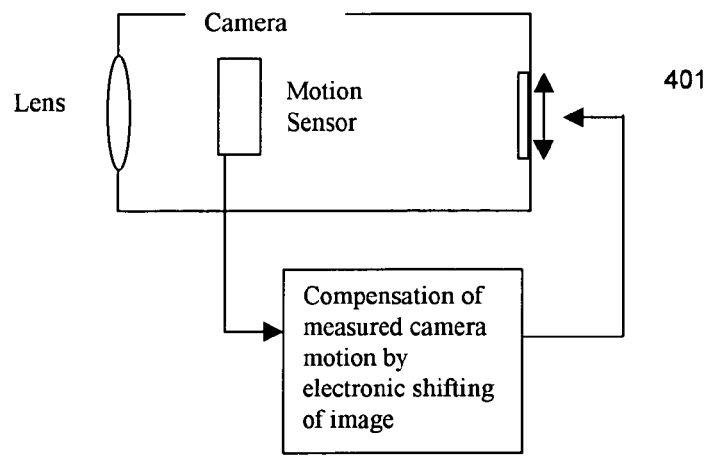
FIG. 4B is a block diagram illustrating two types of electronic stabilization systems.
Figure 4B:
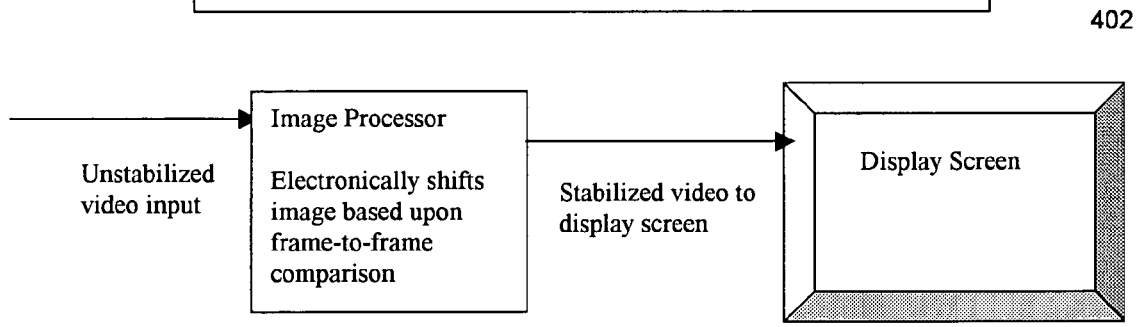

FIG. 4B is a block diagram illustrating two types of electronic stabilization systems. Gyro-to-image electronic stabilization 401 measures mechanical motion of the camera body and implements image re-registration to compensate for this mechanical motion. Such electronic image stabilization is implemented in some hand-held "camcorder" video cameras sold in retail stores by Sony, Panasonic, and others. Gyro-to-image electronic stabilization is most practically implemented in airborne hardware and software within an airborne camera system. Frame-to-frame electronic image stabilization 402 employs image recognition techniques to re-register every frame prior to its display in a succession of image frames. Frame-to-frame stabilization attempts to minimize unwanted shift of successive frames on the display screen.

Figure 5:
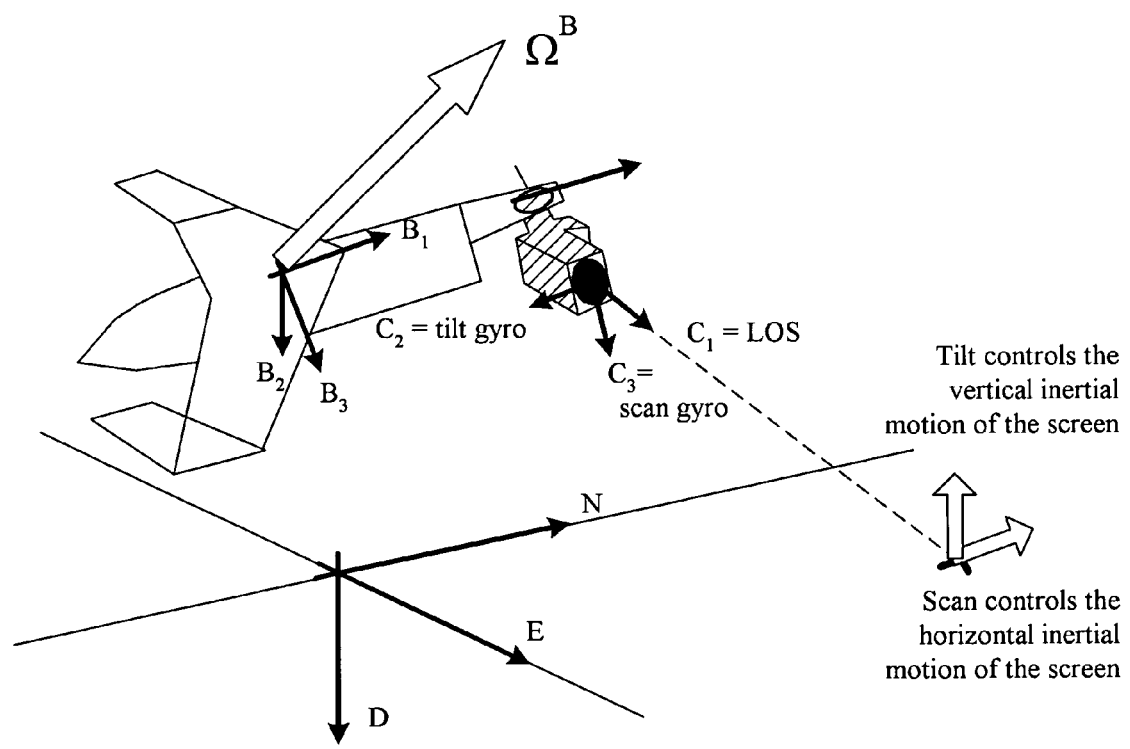
FIG. 5 is a diagram illustrating the reference frames used in the electromechanical stabilization system.

FIG. 5 is a diagram illustrating the reference frames used in the stabilization system in one embodiment. The reference frame of the earth is represented by north N, east E, and down D coordinates. The position of an aircraft, which may be provided by an altimeter and a GPS system, is in the earth reference frame. The reference frame of the body of the aircraft is represented by heading B1, pitch B2, and roll B3 coordinates that may be provided by the aircraft's gyros. The reference frame of the camera is represented by a line of sight C1, tilt C2, and scan C3 coordinates. In one embodiment, the camera is controlled by an inertial stabilization system that controls the gimbal motors to control the orientation of the C1, C2, and C3 camera axes. The electromechanical stabilization system receives camera scan and tilt rate information from the camera rate gyros and adjusts these rates to further account for frame-to-frame jitter information and image recognition, which are provided by the electronic stabilization.

The stabilization system inputs the images generated by the camera, the velocity of the aircraft in the earth reference frame $V_{aircraft}^{E}$, the camera scan rate and tilt rate, the orientations of the aircraft and the camera, and the distance to an object in the images. The stabilization system analyzes consecutive frames and determines the optimal translation of one frame to make it best coincide with the preceding frame. The stabilization system may use conventional pattern recognition techniques to locate the object within the image. The stabilization system provides an offset in pixels to best superimpose one frame onto the next frame. The pixel offsets may be represented as the number of pixels horizontally (also referred to as the scan direction) and the number of pixels vertically (also referred to as the tilt direction) on the display. In one embodiment, the stabilization system has an image buffer in memory that is larger than the displayed image. When the stabilization system detects variations in the position of an object resulting from jitter, it can offset the displayed image by the calculated scan and tilt offset, providing a frame that best superimposes with the previous displayed frame, thus effectively removing the jitter.

Figure 6:
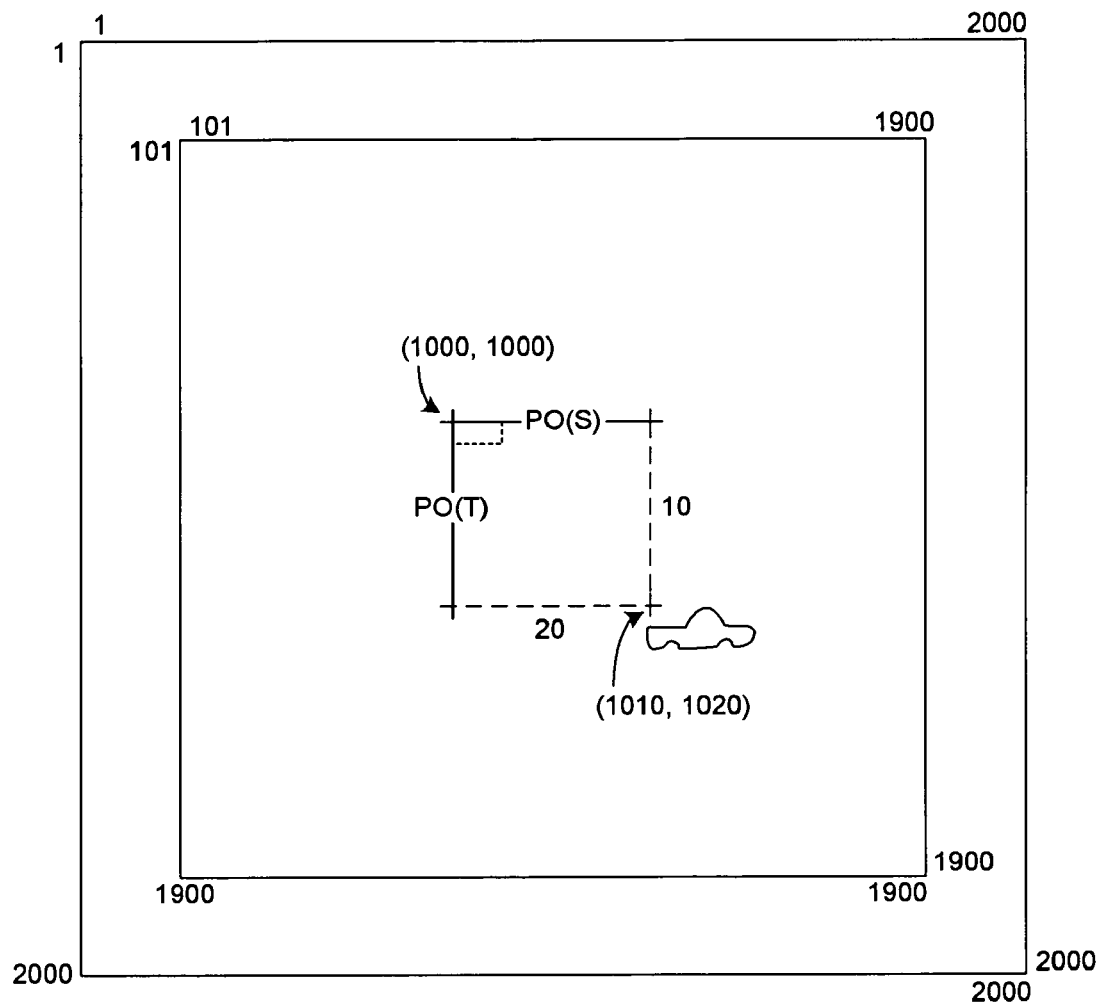
FIG. 6 illustrates the pixel offsets on an object from one frame to the next in one embodiment.

FIG. 6 illustrates the pixel offsets on an object from one frame to the next in one embodiment. The memory buffer stores the image received from the camera using 2000 by 2000 pixels. However, only 1800 by 1800 pixels are displayed on the display. Thus, the image can be adjusted by 100 pixels in the negative and positive scan and tilt directions to account for jitter, assuming the last frame was centered in the memory buffer. In this example, a car is at position (1000, 1000) in the first frame, and the upper left corner of the display corresponds to position (101, 101). In a subsequent frame, the car is now at position (1010, 1020). Thus, the stabilization system can display position (111, 121) as the upper left corner of the display to place the car at the same position on the display from one frame to the next frame.

Since the camera may be panning a scene and the aircraft platform may be moving relative to the scene, a portion of the pixel offsets calculated by the stabilization system may be a result of this desired movement. In such a case, the stabilization system is provided with aircraft velocity and orientation, camera line of sight and orientation, and camera scan and tilt rate to estimate and factor out this desired movement before adjusting the image. The stabilization system calculates the sum of the pixel offsets resulting from the aircraft velocity and orientation, and the camera orientation and angular rate. The stabilization system then subtracts this sum from the pixel offsets calculated from the image analysis to give the pixel offsets attributable to the jitter.

Because the number of offset pixels is limited, the electromechanical stabilization loop keeps the desired image in the center of the camera. To do so, the stabilization system uses the pixel offsets to re-center the gimbal angles of the camera. The stabilization system converts the pixel offsets to corresponding scan and tilt error. The stabilization system also calculates scan and tilt rates. It then adjusts the scan and tilt rate of the camera to track an object or prevent an overflow of the pixel offset in the stabilization system.

The stabilization system uses transformation matrices to represent the current orientation of the body of the aircraft relative to the earth reference frame and the current orientation of the camera to the body reference frame. The camera reference frame relative to the body of the plane reference frame is represented by a transformation matrix $C_{CB}$ for transforming a vector from the body reference frame to the camera reference frame. $C_{CB}$ is a 3-by-3 matrix whose columns are orthogonal and normalized, also referred to as a matrix of direction cosines. The following equation represents the conversion of a position in the body reference frame to the camera reference frame:

$$R^C = C_{CB} R^B \quad (1)$$

where $R^B$ represents the position in the body reference frame and $R^C$ represents the position in the camera reference frame. An example $C_{CB}$ is

| $2^{-1/2}$ | $-2^{-1/2}$ | 0 |
| $2^{-1/2}$ | $2^{-1/2}$ | 0 |
| 0 | 0 | 1 |

The matrix $C_{CB}$ is set based on the angles of the gimbal relative to the body. Thus, this matrix represents the current gimbal angles. A matrix $C_{BE}$ is for transforming from the earth reference frame to the body reference frame. Thus, the matrix $C_{BE}$ represents the heading, pitch, and roll of the aircraft as measured by the gyro of the aircraft.

Figure 7:
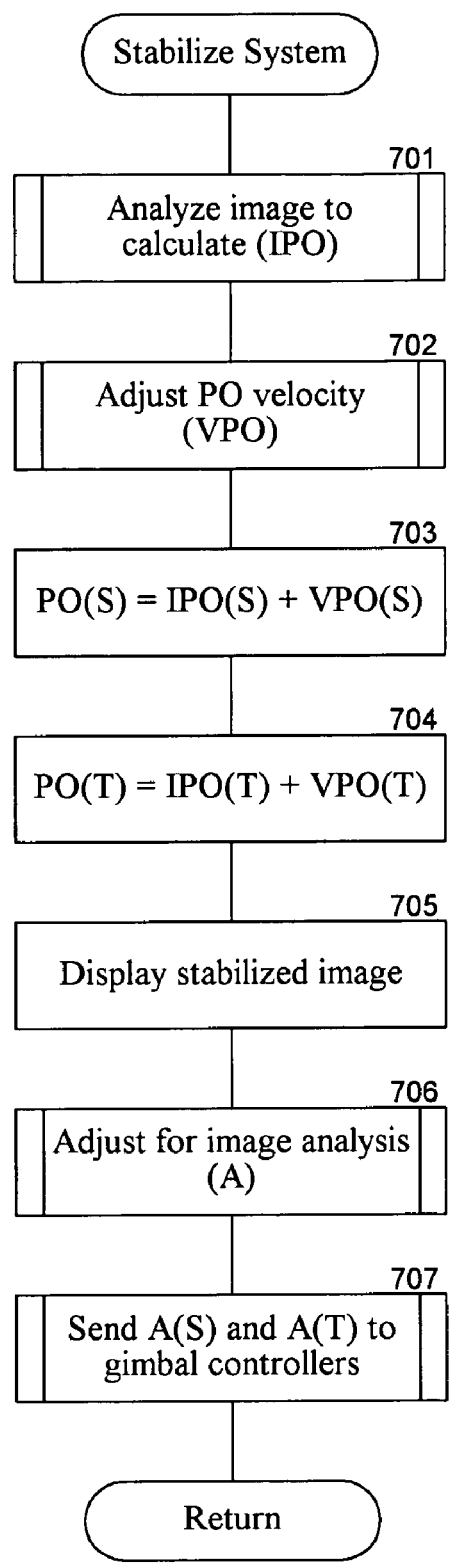
FIG. 7 is a flow diagram illustrating the processing of the stabilization system in one embodiment.

FIG. 7 is a flow diagram illustrating the processing of the stabilization system in one embodiment. The stabilization system calculates an initial image adjustment based on analysis of the image. The stabilization system then adjusts the initial adjustment based on velocity and orientation of the aircraft and the scan and tilt rate of the camera. In block 701, the system invokes a component to analyze the image and calculate image pixel offsets. The invoked component provides the scan and tilt pixel offsets. The component may use standard object recognition techniques to recognize an object in successive frames and set the initial adjustment based on the difference in locations of the object. In block 702, the system invokes the adjust pixel offset component, which determines the velocity pixel offsets that are attributable to the desired aircraft velocity, the rotation of the camera, and the orientations of the aircraft and the camera. In blocks 703-704, the system calculates pixel offsets due to unwanted image jitter by subtracting the velocity pixel offsets and desired camera rotation pixel offsets from the image pixel offsets. In block 705, the stabilization system displays the stabilized image by selecting the portion of the screen that begins at the newly calculated offsets. In block 706, the system invokes the adjust for image analysis component providing the pixel offsets to calculate a change in the scan and tilt rate of the camera to help ensure that the image correction will not exceed the maximum number of allowable pixels. In block 707, the system adjusts the scan and tilt rate of the camera. The system may be invoked to process every frame or only a subset of the frames (e.g., every 10 frames).

Figure 8:
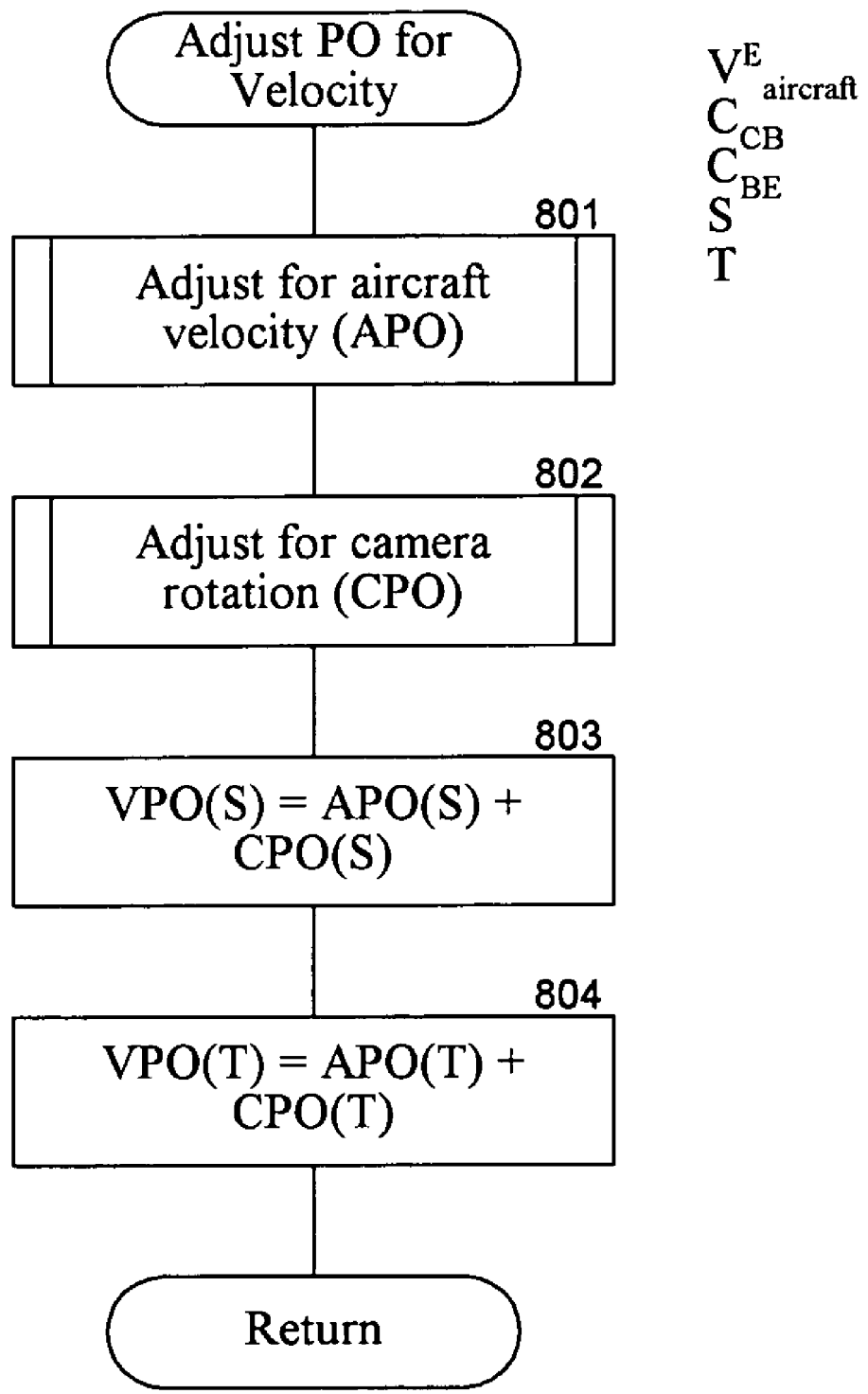
FIG. 8 is a flow diagram illustrating the processing of the analyze pixel offsets for velocity component in one embodiment.

FIG. 8 is a flow diagram illustrating the processing of the analyze pixel offsets for velocity component in one embodiment. The component is provided with the velocity of the aircraft $V_{aircraft}^E$ in the earth reference frame, the orientation of the aircraft $C_{BE}$, and the orientation of the camera $C_{CB}$. In block 801, the component invokes the adjust pixel offsets for aircraft velocity component to calculate the pixel offsets attributable to the velocity of the aircraft. In block 802, the component invokes the adjust pixel offsets for camera rotation component to calculate the pixel offsets attributable to the rotation of the camera. In blocks 803-804, the component combines the pixel offsets for the scan and tilt directions.

Figure 9:
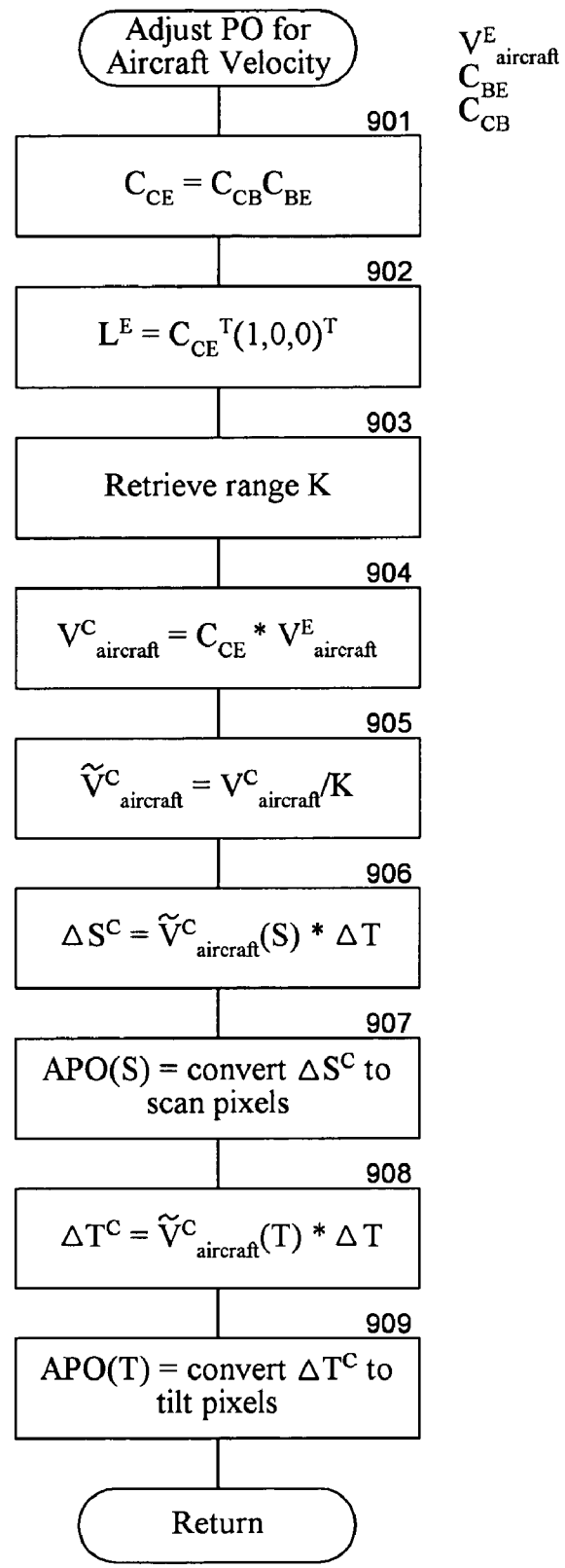
FIG. 9 is a flow diagram illustrating the processing of the adjust pixel offsets for aircraft velocity in one embodiment.

FIG. 9 is a flow diagram illustrating the processing of the adjust pixel offsets for aircraft velocity in one embodiment. In block 901, the component calculates a transformation matrix for transforming from the earth reference frame to the camera reference frame as follows:

$$C_{CE} = C_{CB} C_{BE} \quad (3)$$

In block 902, the component calculates the line of sight of the camera in the earth reference frame as $$L^E = C_{CE}^T (1,0,0)^T \quad (4)$$

where $L^E$ is the line of sight of the camera in the earth reference frame and where the superscript T represents the transpose of the matrix or vector. In block 903, the component retrieves the distance or range K to the object at the center of the camera. The range may be provided by a range finder or by calculating the distance using the altitude of the target. For example, if the object is at sea level, then the distance can be calculated based on the altitude of the aircraft and the angle of the line of sight. In block 904, the component transforms the velocity of the aircraft to the camera reference frame as $$V_{aircraft}^C = C_{CE} * V_{aircraft}^E \quad (5)$$

In block 905, the component normalizes the velocity of the aircraft as $$\tilde{V}_{aircraft}^C = V_{aircraft}^C / K \quad (6)$$

where $\tilde{V}_{aircraft}^C$ is the normalized velocity of the aircraft in radians per hour. For example, if the velocity of the aircraft in the scan direction is 100 km/hr and the distance to the object is 1 km, then the normalized velocity is 100 rad/hr, which means the aircraft moves in the scan direction 100 times the distance to the object in one hour. In block 906, the component calculates the difference in scan units as $$\Delta S^C = \tilde{V}_{aircraft}^C(S) * \Delta T \quad (7)$$

where $\Delta T$ is the frame refresh period. For example, when the normalized velocity is 100 rad/hr and the refresh rate is 15 times per second, then the change in scan units is:

$$\frac{100 \text{ rad}}{\text{hr}} * \frac{1 \text{ hr}}{3600 \text{ sec}} * \frac{1 \text{ sec}}{15} = \frac{1}{540} \text{ rad} = .11 \text{ degrees} \quad (8)$$

In block 907, the component calculates the aircraft pixel offset in the scan direction by converting the difference in scan units to the corresponding pixel offset factoring in the field of view (or zoom) of the camera. The component calculates the pixel offset as $$APO(S) = \Delta S^C * P/Z \quad (9)$$

where APO(S) is the pixel offset in the scan direction, Z is the zoom factor, and P is the pixel density. For example, if the scan units are 1/540 rad and there are 2000 pixels in the scan direction with a field of view of 0.93 rad (1 km field of view at 1 km distance), the pixel offset is $$\frac{1 \text{ rad}}{540} * \frac{2000 \text{ pixels}}{.93 \text{ rad}} = 4 \text{ pixels} \quad (10)$$

In blocks 908-909, the component calculates the pixel offset in the tilt direction in a similar manner.

Figure 10:
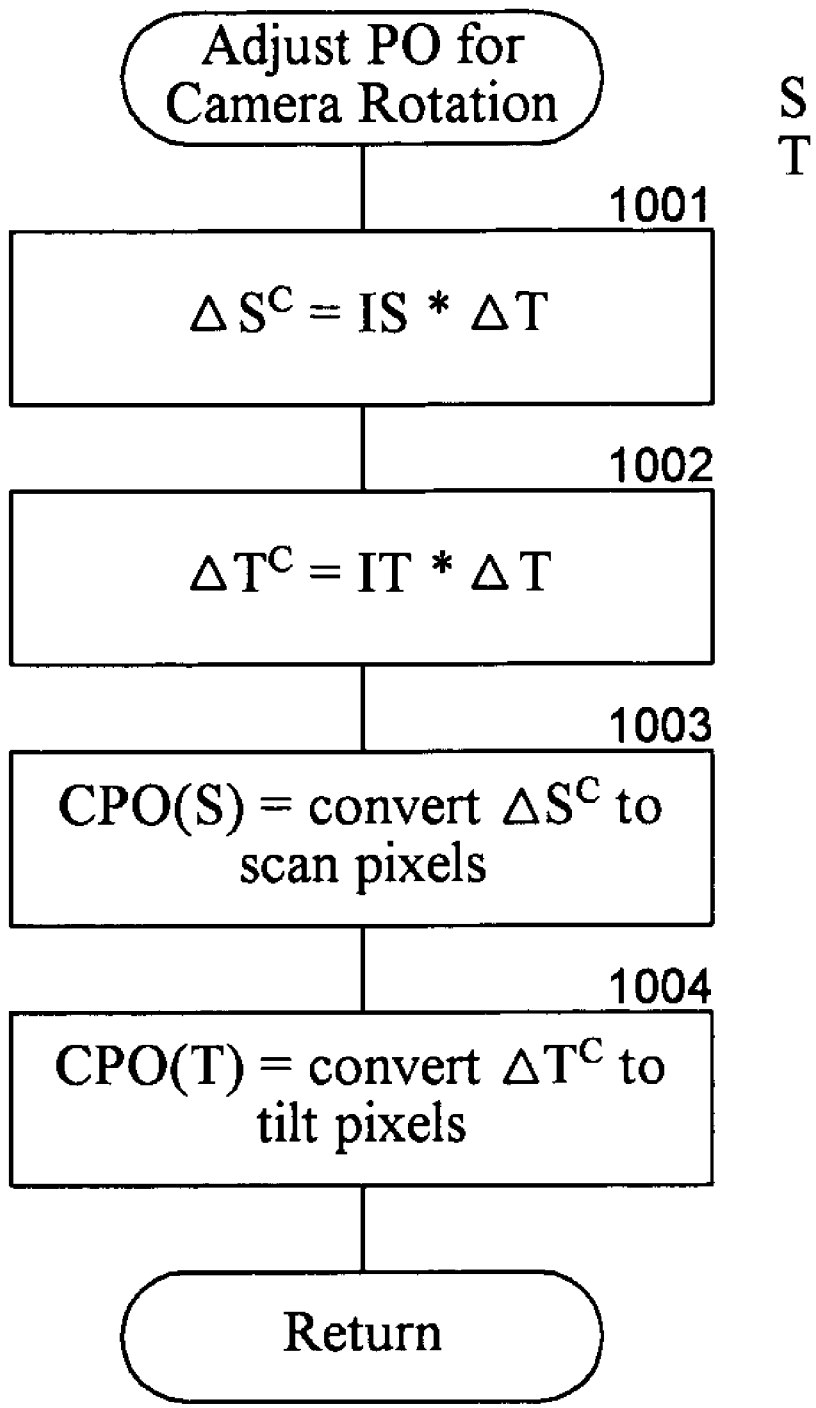
FIG. 10 is a flow diagram illustrating the processing of the adjust pixel offsets for camera rotation component in one embodiment.

FIG. 10 is a flow diagram illustrating the processing of the adjust pixel offsets for the camera rotation component in one embodiment. The component receives the instantaneous camera scan and tilt rates from the gimbal controller. Alternatively, the component can calculate them based on the orientations of the aircraft and the camera. In block 1001, the component calculates the difference in scan units as $$\Delta S^C = IS * \Delta T \quad (11)$$

where IS is the instantaneous scan rate of the camera measured by a rate gyro. In block 1002, the component calculates the difference in tilt units as $$\Delta T^C = IT * \Delta T \quad (12)$$

where IT is the instantaneous tilt rate of the camera measured by a rate gyro. In block 1003, the component calculates the camera pixel offset in the scan direction by converting the difference in scan units to the corresponding pixel offset, factoring in the field of view (or zoom) of the camera. In block 1004, the component calculates the pixel offset in the tilt direction in a similar manner.

Figure 11:
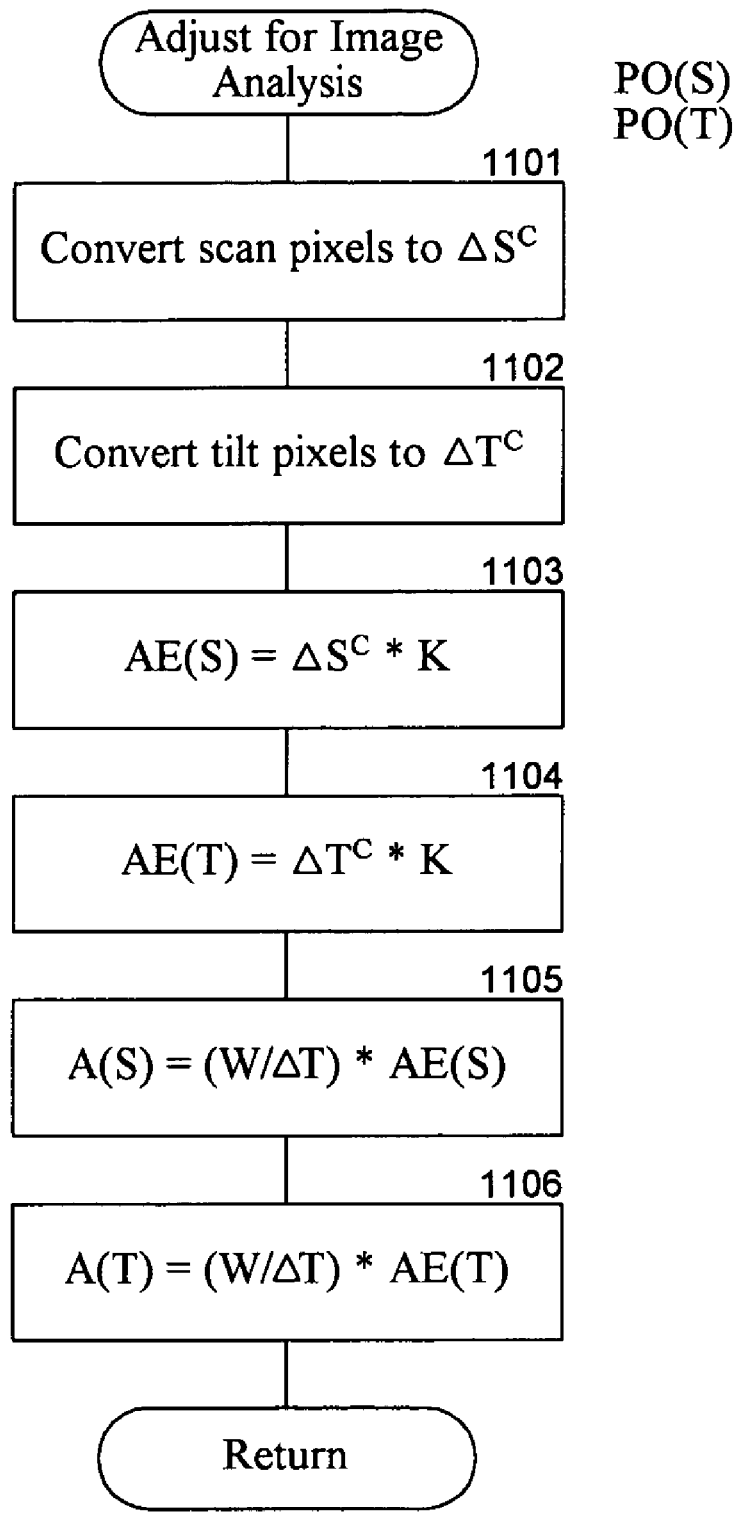
FIG. 11 is a flow diagram illustrating the processing of the adjust for image analysis by the electromechanical stabilization in one embodiment.

FIG. 11 is a flow diagram illustrating the processing of the adjust for image analysis by the stabilization in one embodiment. The component is passed the pixel offsets corresponding to the adjustments made by the stabilization system. In blocks 1101-1102, the component converts the pixel offsets to corresponding scan angle in radians and tilt angle in radians, factoring in the field of view of the camera. In blocks 1103-1104, the component calculates the angle error resulting from the pixel offsets as $$AE(S) = \Delta S^C * K \quad (13)$$

$$AE(T) = \Delta T^C * K \quad (14)$$

where AE is the angle error and K is the distance to the center of the image. In blocks 1105-1106, the component calculates the adjustments for the angle errors as $$A(S) = (W/\Delta T) * AE(S) \quad (15)$$

$$A(T) = (W/\Delta T) * AE(T) \quad (16)$$

where A(S) is the adjustment for the scan rate in radians per second and W is a weighting factor that controls the bandwidth of the feedback loop. The weighting factor controls the speed at which adjustments can be made to the scan and tilt rates. The stabilization system compares the adjustment to the scan rate of the camera provided by the gyro and uses the difference in rate to control the velocity of the gimbal motors.

All patents and articles cited herein are hereby incorporated by reference in their entirety and relied upon. Further details of methods of operating airborne cameras in accordance with other embodiments of the invention are described in U.S. Patent Application No. 60/440,983, filed on Jan. 17, 2003, and entitled, "Compensation for Overflight Velocity When Stabilizing an Airborne Camera," and U.S. Patent Application No. 60/440,977, filed on Jan. 17, 2003, and entitled, "Method and Apparatus for Stabilizing Payload, Including Airborne Cameras," which are hereby incorporated by reference.

One skilled in the art will appreciate that although specific embodiments of the stabilization system have been described herein for purposes of illustration, various modifications may be made without deviating from the spirit and scope of the invention. For example, the principles of the stabilization system may be used on a transport mechanism other than an airplane, such as a satellite, a rocket, a missile, a train, an automobile, and so on. In addition, the camera may even be stationary or not traveling relative to an object in the video. Accordingly, the invention is not limited except by the appended claims.

The invention claimed is:

1. A method for stabilizing an image of an object being taken from a video camera, the video camera being moved by a transport mechanism and being controlled by a line-of-sight controller, the line-of-sight controller having an orientation and an angular velocity, the method comprising:
    receiving a plurality of images of the object; and
    for each of the plurality of received images,
        receiving a distance from the video camera to the object,
        determining a difference between the location of the object within the image and the location of the object within a previously captured image,
        calculating an inter-frame stabilization adjustment based on the distance to the object and the difference between the location of the object within the image and the location of the object within a previously captured image, the inter-frame stabilization adjustment for adjusting the position of a display area of the received images,
        adjusting the position of the display area of the received images based on the inter-frame stabilization adjustment, wherein the received images are larger than the display area and the adjusting moves the display area relative to the received images, and controlling the line-of-sight controller at least in part by, calculating a line-of-sight adjustment for the line-of-sight controller based on the inter-frame stabilization adjustment, adjusting the orientation of the line-of-sight controller based on the calculated line-of-sight adjustment, calculating an angular velocity for the line-of-sight controller based on the inter-frame stabilization adjustment, and setting the angular velocity of the line-of-sight controller to the calculated angular velocity.

2. The method of claim 1 wherein the transport mechanism is an airborne vehicle.

3. The method of claim 1 wherein the line of sight of the video camera is derived from the line-of-sight controller.

4. The method of claim 1 wherein the inter-frame stabilization adjustment specifies the number of pixels in scan and tilt directions.

5. The method of claim 1 wherein the controlling of the line-of-sight controller specifies rate of scan and tilt movement.

6. The method of claim 1 wherein the distance to the object is provided by a range finder.

7. The method of claim 1 wherein the distance to the object is calculated based on the line of sight of the video camera and the difference in altitude of the object and the video camera.

8. The method of claim 1 wherein the velocity of the transport mechanism is relative to the object.

9. The method of claim 1 wherein the velocity of the transport mechanism is relative to an earth frame of reference.

10. The method of claim 1 wherein the calculated inter-frame stabilization adjustment factors in field of view of the display.

11. The method of claim 1, further comprising:

receiving an indication of a user-specified image flow; and controlling the line-of-sight controller in accordance with the user-specified image flow so that the object moves relative to the display area.

12. A method for stabilizing an image of an object being taken from a video camera, the video camera being moved by a transport mechanism and being controlled by a line-of-sight controller, the line-of-sight controller having an orientation and a pan rate, the image being displayed on a display device, the method comprising:

determining a difference in the location of the object within the image from one frame to the next frame;

adjusting the display of the image based on the determined difference to remove small-amplitude jitter; and controlling the line-of-sight controller by, calculating a line-of-sight adjustment for the line-of-sight controller based at least in part on the determined difference, adjusting the orientation of the line-of-sight controller based on the calculated line-of-sight adjustment to account for large-amplitude jitter, calculating a pan rate for the line-of-sight controller based at least in part on the determined difference, and setting the pan rate of the line-of-sight controller to the calculated pan rate.

13. The method of claim 12 wherein the determining of the difference includes analyzing scan and tilt rate of the line-of-sight controller.

14. The method of claim 12 wherein the determining of the difference includes analyzing velocity of the transport mechanism.

15. The method of claim 12 wherein the determining of the difference includes analyzing line of sight of the video camera.

16. The method of claim 12 wherein the determining of the difference includes analyzing orientation of the video camera and the transport mechanism.

17. The method of claim 12 wherein the determining of the difference includes recognizing the object within the images.

18. The method of claim 12 wherein controlling the line-of-sight controller includes compensating for a user-specified image flow.

19. A method for stabilizing images being taken from a video camera mounted on a moving vehicle, the video camera having a line of sight being controlled by a line-of-sight controller, the line-of-sight controller having an orientation and a rate of rotation, the method comprising:

calculating initial coordinates for a viewport, the viewport corresponding to a portion of an image that is to be displayed;

calculating inter-frame stabilization adjustments based on the change in location of an object in a succession of image frames to account for a velocity of the vehicle, the inter-frame stabilization adjustments used to electronically move the viewport from one frame to the next frame;

moving the viewport in accordance with the calculated inter-frame stabilization adjustments so that the viewport does not remain centered relative to the images taken from the video camera;

displaying a portion of an image corresponding to the moved viewport; and controlling the line-of-sight controller at least in part by, calculating a line-of-sight adjustment for the line-of-sight controller based on the inter-frame stabilization adjustments, adjusting the orientation of the line-of-sight controller in accordance with the calculated line-of-sight adjustment, calculating a rate of rotation for the line-of-sight controller based on the inter-frame stabilization adjustments, and setting the rate of rotation of the line-of-sight controller to the calculated rate of rotation.

20. The method of claim 19 wherein the calculating of the inter-frame stabilization adjustments factors in scan and tilt rate of the line-of-sight controller.

21. The method of claim 19 wherein the calculating of the inter-frame stabilization adjustments factors in line of sight of the video camera.

22. The method of claim 19 wherein the calculating of the inter-frame stabilization adjustments factors in orientation of the video camera and the vehicle.

23. The method of claim 19 wherein the calculating of the inter-frame stabilization adjustments includes recognizing an object within the images.

24. The method of claim 19 wherein the calculated line-of-sight adjustment specifies a scan and tilt rate for the line-of-sight controller.

25. A method in a camera stabilization system for stabilizing the display of images received from a video camera attached to an aircraft and controlled by a gimbal-based line-of-sight controller, the method comprising:

receiving a first image from the video camera;

receiving a second image from the video camera;

determining the position of an object in the first image;
determining the position of the object in the second image;
determining an image pixel offset in the scan direction, IPO(S), based on the difference in the position of the object in the first and second images;
determining an image pixel offset in the tilt direction, IPO(T), based on the difference in the position of the object in the first and second images;
determining a pixel offset in the scan direction, PO(S), based on IPO(S);
determining a pixel offset in the tilt direction, PO(T), based on IPO(T);
adjusting the display of an image on a display device of the camera stabilization system based on PO(S) and PO(T);
converting PO(S) to a corresponding scan angle based on the field of view of the video camera;
converting PO(T) to a corresponding tilt angle based on the field of view of the video camera;
adjusting a scan rate of the line-of-sight controller based on the scan angle;
adjusting a tilt rate of the line-of-sight controller based on the tilt angle; and
determining aircraft pixel offsets caused by the movement of the aircraft by,
    receiving an indication of the velocity of the aircraft in the earth reference frame, $V_{aircraft}^{E}$,
    receiving a matrix, $C_{BE}$, corresponding to the orientation of the aircraft in the earth reference frame,
    receiving a matrix, $C_{CB}$, corresponding to the orientation of the video camera,
    calculating a transformation matrix, $C_{CE}$, for transforming from the earth reference frame to the camera reference frame, wherein $C_{CE}=C_{CB}C_{BE}$,
    calculating a line of sight, $L^E$, of the video camera in the earth reference frame, wherein $L^E=C_{CE}^{T}(1,0,0)^T$,
    determining the distance, K, to an object at the center of the image,
    determining the velocity of the aircraft in the camera reference frame, $V_{aircraft}^{C}$, wherein $V_{aircraft}^{C}=C_{CE}*V_{aircraft}^{E}$,
    calculating a normalized velocity of the aircraft $V_{aircraft}^{C}=V_{aircraft}^{C}/K$,
    calculating a first difference in scan units $\Delta S_1^{C}$, wherein $\Delta S_1^{C}=V_{aircraft}^{C}(S)*\Delta T$, wherein $V_{aircraft}^{C}(S)$ corresponds to the normalized velocity of the aircraft in the scan direction, and wherein $\Delta T$ corresponds to a frame refresh period,
    calculating a first difference in tilt units $\Delta T_1^{C}$, wherein $\Delta T_1^{C}=V_{aircraft}^{C}(T)*\Delta T$, wherein $V_{aircraft}^{C}(T)$ corresponds to the normalized velocity of the aircraft in the tilt direction,
    calculating an aircraft pixel offset in the scan direction APO(S), wherein APO(S)=$\Delta S_1^{C}*P/Z$, wherein P corresponds to a pixel density associated with the video camera, and wherein Z corresponds to a zoom factor associated with the video camera,
    calculating an aircraft pixel offset in the tilt direction APO(T), wherein APO(T)=$\Delta T_1^{C}*P/Z$
wherein PO(S) is determined based on IPO(S) and APO(S), and
wherein PO(T) is determined based on IPO(T) and APO(T)
so that both the display of the image and the line-of-sight controller are adjusted based on IPO(S) and IPO(T).

26. The method of claim 25, further comprising:
determining camera pixel offsets caused by the rotation of the video camera by,
    receiving the instantaneous camera scan rate IS,
    receiving the instantaneous camera tilt rate IT,
    calculating a second difference in scan units, $\Delta S_2^{C}$, wherein $\Delta S_2^{C}=IS*\Delta T$,
    calculating a second difference in tilt units, $\Delta T_2^{C}$, wherein $\Delta T_2^{C}=IT*\Delta T$,
    calculating a camera pixel offset in the scan direction, CPO(S), based on $\Delta S_2^{C}$,
    calculating a camera pixel offset in the tilt direction, CPO(T), based on $\Delta T_2^{C}$
wherein PO(S) is determined based on IPO(S), APO(S), and CPO(S), and
wherein PO(T) is determined based on IPO(T), APO(T), and CPO(T).

* * * * *